(12) United States Patent
Scott et al.

(10) Patent No.: US 10,112,109 B2
(45) Date of Patent: Oct. 30, 2018

(54) SHARED MULTIMEDIA EXPERIENCE INCLUDING USER INPUT

(71) Applicant: AT&T Intellectual Property I, L.P., Atlanta, GA (US)

(72) Inventors: Charles Varnon Scott, Austin, TX (US); Ankur Mukerji, Auburn, CA (US); Scott Anthony White, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/556,650

(22) Filed: Dec. 1, 2014

(65) Prior Publication Data

US 2015/0087367 A1    Mar. 26, 2015

Related U.S. Application Data

(63) Continuation of application No. 12/495,413, filed on Jun. 30, 2009, now Pat. No. 8,904,421.

(51) Int. Cl.

| | |
|---|---|
| H04N 21/478 | (2011.01) |
| A63F 13/35 | (2014.01) |
| G06Q 10/00 | (2012.01) |
| G06Q 30/00 | (2012.01) |
| H04N 21/4788 | (2011.01) |
| H04L 12/18 | (2006.01) |
| H04L 12/58 | (2006.01) |
| H04L 29/06 | (2006.01) |

(52) U.S. Cl.
CPC .............. *A63F 13/35* (2014.09); *G06Q 10/00* (2013.01); *G06Q 30/00* (2013.01); *H04L 12/1813* (2013.01); *H04L 51/32* (2013.01); *H04L 65/601* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 5,559,975 A | 9/1996 | Christie et al. | |
| 5,574,928 A | 11/1996 | White et al. | |
| 5,590,352 A | 12/1996 | Zuraski, Jr. et al. | |
| 5,632,023 A | 5/1997 | White et al. | |
| 5,649,225 A | 7/1997 | White et al. | |
| 5,689,693 A | 11/1997 | White | |
| 5,695,400 A * | 12/1997 | Fennell, Jr. ............. | A63F 13/12 463/42 |
| 5,696,955 A | 12/1997 | Goddard et al. | |
| 5,737,629 A | 4/1998 | Zuraski, Jr. et al. | |
| 5,764,938 A | 6/1998 | White et al. | |
| 5,799,162 A | 8/1998 | Christie et al. | |

(Continued)

*Primary Examiner* — Nicholas T Corbo
(74) *Attorney, Agent, or Firm* — Jackson Walker L.L.P.

(57) ABSTRACT

Systems provide shared multimedia content to a plurality of members of a collaboration group, request input related to the multimedia content from a portion of the plurality of members, modify the shared multimedia content to include an indication of a portion of the input, and provide the modified shared multimedia content to the plurality of members. The shared multimedia content may include a television program, a movie, or a real-time event. The requested input may include a prediction or a trivia answer related to the shared multimedia content.

19 Claims, 8 Drawing Sheets

(56) References Cited

U.S. PATENT DOCUMENTS

| | | |
|---|---|---|
| 5,805,853 A | 9/1998 | White et al. |
| 5,857,089 A | 1/1999 | Goddard et al. |
| 5,903,772 A | 5/1999 | White et al. |
| 5,996,067 A | 11/1999 | White |
| 6,035,386 A | 3/2000 | Christie et al. |
| 6,287,199 B1 | 9/2001 | McKeown et al. |
| 6,351,801 B1 | 2/2002 | Christie et al. |
| 6,357,024 B1 | 3/2002 | Dutton et al. |
| 6,408,379 B1 | 6/2002 | Juffa et al. |
| 6,442,707 B1 | 8/2002 | McGrath et al. |
| 6,446,189 B1 | 9/2002 | Zuraski, Jr. et al. |
| 6,446,215 B1 | 9/2002 | Meyer et al. |
| 6,493,819 B1 | 12/2002 | Mahurin et al. |
| 6,542,986 B1 | 4/2003 | White |
| 6,625,726 B1 | 9/2003 | Clark et al. |
| 6,806,889 B1 | 10/2004 | Malaure et al. |
| 7,051,218 B1 | 5/2006 | Gulick et al. |
| 7,174,467 B1 | 2/2007 | Helms et al. |
| 7,263,457 B2 | 8/2007 | White et al. |
| 7,302,274 B2 | 11/2007 | Makela et al. |
| 7,328,371 B1 | 2/2008 | Kalyanasundharam et al. |
| 7,350,119 B1 | 3/2008 | Zuraski, Jr. et al. |
| 7,356,771 B2 | 4/2008 | Paul et al. |
| 7,518,991 B2 | 4/2009 | Sullivan et al. |
| 7,602,898 B2 | 10/2009 | Klein et al. |
| 7,613,773 B2 | 11/2009 | Watt |
| 7,620,902 B2 | 11/2009 | Manion et al. |
| 7,657,843 B2 | 2/2010 | White |
| 7,665,002 B1 | 2/2010 | White et al. |
| 7,734,579 B2 | 6/2010 | White et al. |
| 7,814,115 B2 | 10/2010 | White et al. |
| 7,851,689 B2 | 12/2010 | Reynolds et al. |
| 7,860,962 B2 | 12/2010 | White et al. |
| 8,176,518 B1 | 5/2012 | Junkin et al. |
| 2001/0003099 A1* | 6/2001 | Von Kohorn ............... 463/40 |
| 2002/0042293 A1* | 4/2002 | Ubale ............... A63F 13/12 463/9 |
| 2002/0083436 A1* | 6/2002 | Fidler ............... 725/22 |
| 2002/0100039 A1* | 7/2002 | Iatropoulos ............ H04H 20/30 725/24 |
| 2003/0033157 A1 | 2/2003 | Dempski et al. |
| 2005/0086697 A1 | 4/2005 | Haseltine |
| 2006/0039547 A1 | 2/2006 | Klein et al. |
| 2006/0062363 A1* | 3/2006 | Albrett ............... 379/101.01 |
| 2006/0087978 A1 | 4/2006 | Sullivan et al. |
| 2006/0126808 A1 | 6/2006 | Dallessandro et al. |
| 2006/0136964 A1 | 6/2006 | Diez et al. |
| 2006/0218590 A1 | 9/2006 | White |
| 2006/0236221 A1 | 10/2006 | McCausland et al. |
| 2006/0253542 A1 | 11/2006 | McCausland et al. |
| 2007/0036313 A1 | 2/2007 | White et al. |
| 2007/0036519 A1 | 2/2007 | White |
| 2007/0038773 A1 | 2/2007 | White et al. |
| 2007/0038957 A1 | 2/2007 | White |
| 2007/0061842 A1 | 3/2007 | Walter et al. |
| 2007/0069474 A1* | 3/2007 | Allen ............... A63F 9/183 273/430 |
| 2007/0089151 A1 | 4/2007 | Moore et al. |
| 2007/0127696 A1 | 6/2007 | White |
| 2007/0156370 A1 | 7/2007 | White et al. |
| 2007/0183745 A1 | 8/2007 | White |
| 2007/0185968 A1 | 8/2007 | White et al. |
| 2007/0186247 A1 | 8/2007 | White et al. |
| 2007/0192822 A1 | 8/2007 | White |
| 2007/0204118 A1 | 8/2007 | White |
| 2007/0204308 A1* | 8/2007 | Nicholas et al. ............... 725/86 |
| 2007/0293322 A1* | 12/2007 | Horowitz ............... G07F 17/32 463/42 |
| 2007/0294721 A1 | 12/2007 | Haeuser et al. |
| 2008/0098436 A1 | 4/2008 | White |
| 2008/0104454 A1 | 5/2008 | White |
| 2008/0114845 A1 | 5/2008 | Rao |
| 2008/0222045 A1 | 9/2008 | Mukerji et al. |
| 2008/0229257 A1 | 9/2008 | White |
| 2008/0229352 A1* | 9/2008 | Pino et al. ............... 725/22 |
| 2008/0229362 A1 | 9/2008 | White et al. |
| 2008/0229372 A1 | 9/2008 | White |
| 2008/0242357 A1 | 10/2008 | White |
| 2008/0244668 A1 | 10/2008 | White |
| 2008/0247520 A1 | 10/2008 | Scott |
| 2008/0263608 A1 | 10/2008 | White |
| 2008/0263618 A1 | 10/2008 | White |
| 2008/0271091 A1 | 10/2008 | White |
| 2008/0298388 A1 | 12/2008 | White |
| 2009/0019480 A1 | 1/2009 | White |
| 2009/0019481 A1 | 1/2009 | White |
| 2009/0019483 A1 | 1/2009 | White |
| 2009/0019497 A1 | 1/2009 | White et al. |
| 2009/0019507 A1 | 1/2009 | White |
| 2009/0025036 A1 | 1/2009 | White et al. |
| 2009/0025055 A1 | 1/2009 | White et al. |
| 2009/0046987 A1 | 2/2009 | White et al. |
| 2009/0049399 A1 | 2/2009 | White et al. |
| 2009/0049402 A1 | 2/2009 | White |
| 2009/0049490 A1 | 2/2009 | White |
| 2009/0049493 A1 | 2/2009 | White et al. |
| 2009/0049506 A1 | 2/2009 | White et al. |
| 2009/0063581 A1 | 3/2009 | White et al. |
| 2009/0063969 A1 | 3/2009 | White |
| 2009/0064238 A1 | 3/2009 | White et al. |
| 2009/0064240 A1 | 3/2009 | White |
| 2009/0070408 A1 | 3/2009 | White |
| 2009/0070839 A1 | 3/2009 | Cansler et al. |
| 2009/0070845 A1 | 3/2009 | White et al. |
| 2009/0074164 A1 | 3/2009 | Cansler et al. |
| 2009/0077610 A1 | 3/2009 | White et al. |
| 2009/0077614 A1 | 3/2009 | White et al. |
| 2009/0100019 A1 | 4/2009 | White et al. |
| 2009/0138460 A1 | 5/2009 | Gorti et al. |
| 2009/0161532 A1 | 6/2009 | Sullivan et al. |
| 2009/0177866 A1 | 7/2009 | Choate et al. |
| 2009/0183204 A1 | 7/2009 | White |
| 2009/0183213 A1 | 7/2009 | Mukerji et al. |
| 2009/0183217 A1 | 7/2009 | Mukerji et al. |
| 2009/0183222 A1 | 7/2009 | White et al. |
| 2009/0186700 A1* | 7/2009 | Konkle ............... A63F 13/87 463/42 |
| 2009/0187944 A1 | 7/2009 | White et al. |
| 2009/0190734 A1 | 7/2009 | White et al. |
| 2009/0192870 A1 | 7/2009 | White et al. |
| 2009/0193453 A1 | 7/2009 | Cansler et al. |
| 2009/0193463 A1* | 7/2009 | Choi ............... H04N 7/173 725/40 |
| 2009/0193482 A1 | 7/2009 | White et al. |
| 2009/0193489 A1 | 7/2009 | White et al. |
| 2009/0198588 A1 | 8/2009 | White et al. |
| 2009/0199234 A1 | 8/2009 | Mukerji et al. |
| 2009/0199237 A1 | 8/2009 | White et al. |
| 2009/0199245 A1 | 8/2009 | White et al. |
| 2009/0199254 A1 | 8/2009 | White et al. |
| 2009/0199256 A1 | 8/2009 | White et al. |
| 2009/0199257 A1 | 8/2009 | White et al. |
| 2009/0204487 A1 | 8/2009 | Cansler et al. |
| 2009/0204989 A1 | 8/2009 | White et al. |
| 2009/0204991 A1 | 8/2009 | White et al. |
| 2009/0204993 A1 | 8/2009 | White et al. |
| 2009/0210300 A1 | 8/2009 | Cansler et al. |
| 2009/0210477 A1 | 8/2009 | White et al. |
| 2009/0210903 A1 | 8/2009 | White |
| 2009/0210909 A1 | 8/2009 | Mukerji et al. |
| 2009/0210922 A1 | 8/2009 | White et al. |
| 2009/0217317 A1 | 8/2009 | White |
| 2009/0217321 A1 | 8/2009 | White |
| 2009/0217356 A1 | 8/2009 | Scott et al. |
| 2009/0222853 A1 | 9/2009 | White et al. |
| 2009/0222854 A1 | 9/2009 | Cansler et al. |
| 2009/0228326 A1 | 9/2009 | White |
| 2009/0228582 A1 | 9/2009 | White et al. |
| 2009/0228938 A1 | 9/2009 | White et al. |
| 2009/0228947 A1 | 9/2009 | White |
| 2009/0235307 A1 | 9/2009 | White et al. |
| 2009/0241143 A1 | 9/2009 | White et al. |
| 2009/0241150 A1 | 9/2009 | White et al. |
| 2009/0249242 A1 | 10/2009 | White |

(56) References Cited

U.S. PATENT DOCUMENTS

| | | |
|---|---|---|
| 2009/0249428 A1 | 10/2009 | White et al. |
| 2009/0271817 A1 | 10/2009 | White et al. |
| 2009/0271819 A1 | 10/2009 | Cansler et al. |
| 2009/0271830 A1 | 10/2009 | White |
| 2009/0276806 A1 | 11/2009 | Anderson et al. |
| 2009/0282435 A1 | 11/2009 | White et al. |
| 2009/0282438 A1 | 11/2009 | White |
| 2009/0293088 A1 | 11/2009 | Mukerji et al. |
| 2009/0300671 A1 | 12/2009 | Scott et al. |
| 2009/0300695 A1 | 12/2009 | White et al. |
| 2009/0319350 A1 | 12/2009 | Cansler et al. |
| 2009/0325713 A1 | 12/2009 | Cansler et al. |
| 2009/0328093 A1 | 12/2009 | Cansler et al. |
| 2010/0016014 A1 | 1/2010 | White |
| 2010/0031288 A1 | 2/2010 | Scott et al. |
| 2010/0043030 A1 | 2/2010 | White |
| 2010/0061567 A1 | 3/2010 | White |
| 2010/0064221 A1 | 3/2010 | White et al. |
| 2010/0070992 A1 | 3/2010 | Morris et al. |
| 2010/0083373 A1 | 4/2010 | White et al. |
| 2010/0095243 A1 | 4/2010 | White |
| 2010/0162345 A1 | 6/2010 | White |
| 2010/0223660 A1 | 9/2010 | Scott et al. |
| 2010/0223673 A1 | 9/2010 | Scott et al. |
| 2010/0226288 A1 | 9/2010 | Scott et al. |
| 2010/0228547 A1 | 9/2010 | Scott et al. |
| 2010/0245113 A1 | 9/2010 | Schmehl et al. |
| 2010/0251299 A1 | 9/2010 | Scott et al. |
| 2010/0332466 A1 | 12/2010 | White et al. |
| 2011/0010742 A1 | 1/2011 | White |
| 2011/0047284 A1 | 2/2011 | White et al. |

\* cited by examiner

SHARED MULTIMEDIA EXPERIENCE INCLUDING USER INPUT

The present patent application is a continuation of U.S. patent application Ser. No. 12/495,413, filed Jun. 30, 2009, issuing as U.S. Pat. No. 8,904,421 on Dec. 2, 2014, the entirety of which is hereby incorporated by reference.

BACKGROUND

Field of the Disclosure

The present disclosure relates to multimedia services, and more particularly, to providing shared multimedia experiences that includes user input.

Description of the Related Art

Social networking related to multimedia programs is often conducted through means that are separate from a provider network that provides the multimedia content. For example, friends that want to discuss multimedia programs often do so over telephones or through in-person interactions.

DESCRIPTION OF THE EMBODIMENT(S)

Figure 1:
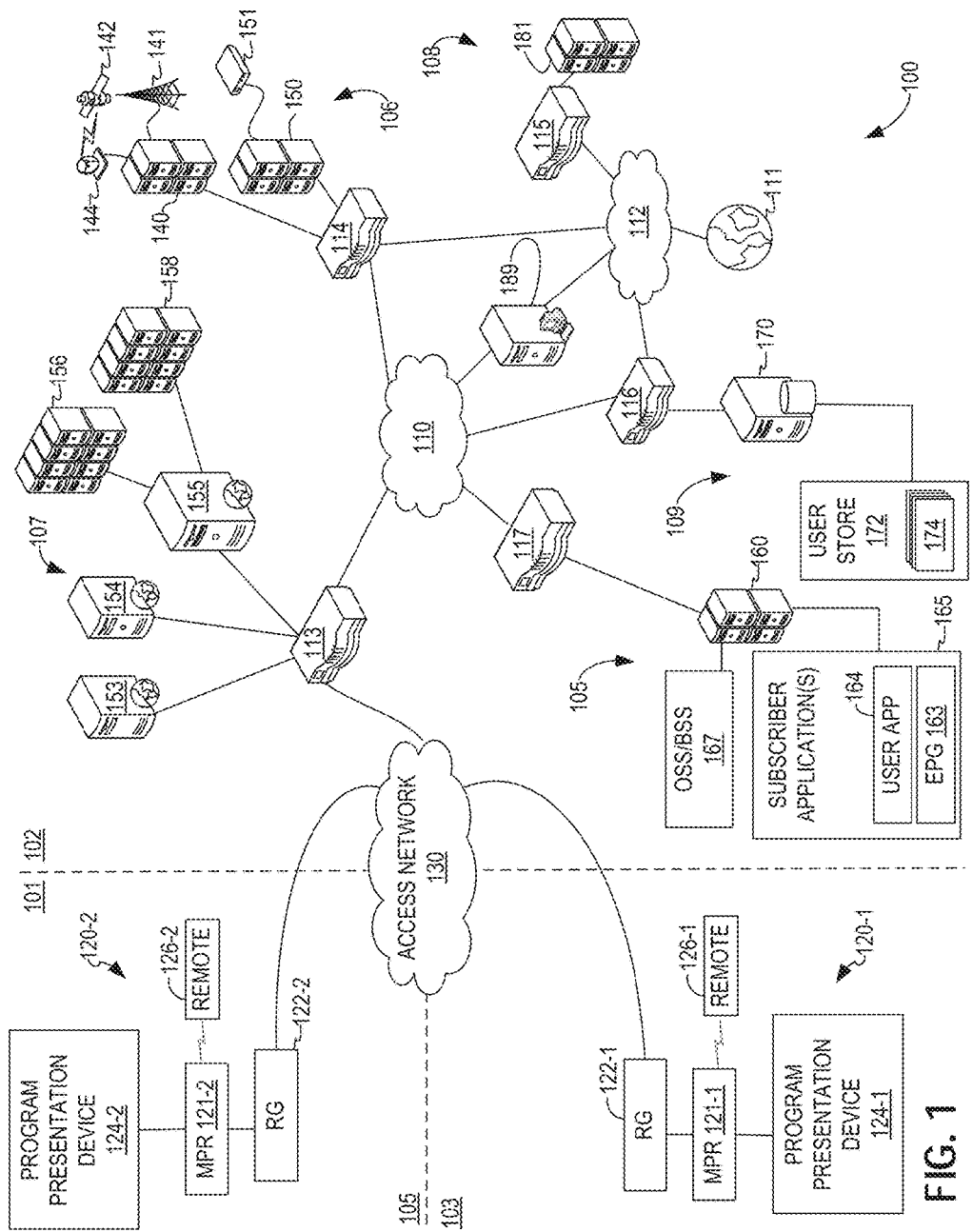
FIG. 1 is a block diagram of selected elements of a multimedia content distribution network for providing shared multimedia experiences with user input.

Disclosed embodiments provide social networking features related to multimedia objects simultaneously consumed (e.g., viewed and heard) by members of collaboration groups. Collaboration group members may simultaneously receive a multimedia object such as through the transmission of a real-time event, television program, movie, pay-per-view event, or video-on-demand (VOD) event and provide comments, answer questions, and predict outcomes of the multimedia object. In some embodiments, collaboration group members simultaneously are presented with a challenge such as a puzzle and group members may interactively provide answers to the puzzle. The collaboration group members experience a shared presentation of the multimedia object and the shared presentation is re-iteratively updated with user input from one or more group members. In some embodiments, group members compete to answer trivia questions, provide correct puzzle answers, or predict outcomes, for example, related to the multimedia object. Disclosed systems may characterize collaboration group members and multimedia objects based on quality of input, content of input, accuracy of input, frequency of input, and other factors related to user input received from collaboration group members.

In one aspect, an embodied collaborative multimedia interaction service includes enabling a first member and a second member to participate in a collaboration group. The first member receives a multimedia object in a first location and the second member simultaneously receives the multimedia object in a second location. Example multimedia objects include pay-per-view events, VOD events, movies, television programs, and puzzles. In some embodiments, the first location and the second location are not within a line of sight and may be within different geographic areas. The service prompts collaboration group members, including the first member and the second member, to provide responses. Prompting the collaboration group members may include displaying a question about the multimedia object and displaying suggested answers to the question. A first response to the prompt is recorded for the first member and a second response to the prompt is recorded for the second member.

In some embodiments, the service allows collaboration group members to make predictions regarding the outcome of the multimedia object. For example, collaboration group members may interactively guess regarding whether a field goal will be made during a live football game broadcast. Embodied services may enable collaboration group members to make multiple predictions throughout the broadcast of the multimedia object and keep score for determining a winning group member. Accordingly, first or second responses to the prompts may include a prediction regarding a future portion of the multimedia object, in which the future portion of the multimedia object is undetermined during the prompting. In some embodiments, the service evaluates the collaboration group member responses and displays the results of the evaluations to members of the collaboration group. A winning member of the collaboration group may be declared and an indication of the winning member may be provided to the collaboration group members. In some embodiments, the service includes characterizing members based on their respective responses. For example, a collaboration group member may be assigned to a demographic classification based on one or more responses. In addition, a quality level of the multimedia object may be assessed based on one or more of the responses.

In another aspect, an embodied data processing system enabled for delivering multimedia content includes a processor having access to computer executable instructions for recognizing a first member and a second member of a collaboration group. Recognizing members of the collaboration group may include receiving login credentials, biometric input, or other such data. Further instructions provide a portion of the multimedia program to the first member, provide a portion of the multimedia program to the second member, and provide to one or both of the members a request for user response. Further instructions receive a first member user response that is responsive to the request and that is related to the multimedia program. Data indicative of the first member user response is stored and an indication of the first member user response is provided to the second member. In some embodiments, communication occurs between first member customer premises equipment (CPE) devices and second member CPE devices. Accordingly, disclosed embodiments may include instructions for establishing a peer-to-peer connection between a first member client device and a second member client device. In some embodiments, peer-to-peer connections may be established over a public network such as the Internet while the multimedia object is distributed by a private network provided by an Internet protocol television (IPTV) service provider.

Accordingly, disclosed data processing systems include instructions for interactive social networking between collaboration group members during the consumption of multimedia objects such as television programs, movies, pay-per-view events, VOD events, and real-time broadcasts. Requests made to collaboration group members may include trivia questions or requests for predictions regarding undetermined events related to the provided multimedia object. The system may include instructions for characterizing group members or the multimedia object based on the responses. Events on which to base requests for predictions may be detected by analyzing subtitles (e.g., closed caption text), metadata, audio portions of the multimedia object, or video portions of the multimedia object.

In the following description, details are set forth by way of example to facilitate a person of ordinary skill in the art to practice the disclosed subject matter without undue experimentation. It should be apparent to a person of ordinary skill, however, that the disclosed embodiments are exemplary and not exhaustive of all possible embodiments. Throughout this disclosure, a hyphenated form of a reference numeral may refer to a specific instance of an element and the un-hyphenated form of the reference numeral may refer to the element generically or collectively. Thus, for example, multimedia processing resource (MPR) 121-1 refers to an instance of an MPR, which may be referred to collectively as MPRs 121 and any one of which may be referred to generically as an MPR 121.

As background, systems for distributing multimedia content are discussed. In accordance with disclosed embodiments, the systems may be enabled to provide shared multimedia experiences and request and receive user input to contribute to the shared multimedia experience. Television programs, VOD movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a large number of multimedia content channels (also referred to herein as "channels"), each occupying a different frequency band or frequency channel, through a coaxial cable, a fiber-optic cable, or a combination of the two. The bandwidth required to transport simultaneously a large number of multimedia channels may challenge the bandwidth capacity of cable-based networks. In these types of networks, a tuner within an MPR, set-top box (STB), television, or other form of receiver is required to select a channel from the mixed signal for playing or recording. A user wishing to play or record multiple channels typically needs to have distinct tuners for each desired channel. This can be an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies to distribute multimedia content. Instead of being associated with a particular frequency band, an IPTV television program, movie, or other form of multimedia content is a packet-based stream that corresponds to a particular network endpoint, e.g., an IP address and a transport layer port number. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an indication of a network endpoint that is associated with the desired channel.

IPTV may be implemented, at least in part, over existing infrastructure including, for example, a proprietary network that may include existing telephone lines, possibly in combination with CPE including, for example, a digital subscriber line (DSL) modem in communication with an STB, a display, and other appropriate equipment to receive multimedia content and convert it into usable form. In some implementations, a core portion of an IPTV network is implemented with fiber optic cables while the so-called "last mile" may include conventional, unshielded, twisted-pair, copper cables.

IPTV networks support bidirectional (i.e., two-way) communication between a subscriber's CPE and a service provider's equipment. Bidirectional communication allows a service provider to deploy advanced features, such as VOD, pay-per-view, advanced programming information, electronic programming guides (EPGs), and the like. Bidirectional networks may also enable a service provider to collect information related to a user's preferences, whether for purposes of providing preference based features to the user, providing potentially valuable information to service providers, or providing potentially lucrative information to content providers and others. In accordance with disclosed embodiments, bidirectional networks permit users to provide user input and answer questions related to a shared multimedia experience.

Referring now to the drawings, FIG. 1 illustrates selected aspects of multimedia content distribution network (MCDN) 100 for providing a shared multimedia experience to multiple collaboration group members and enabling the collaboration group members to contribute content to the shared multimedia experience. MCDN 100, as shown, is a multimedia content provider network that may be generally divided into client side 101 and service provider side 102 (a.k.a., server side 102). Client side 101 includes all or most of the resources depicted to the left of access network 130 while server side 102 encompasses the remainder.

In operation, MCDN 100 may deliver multimedia content and Web content from service provider side 102 to client side 101. In accordance with disclosed embodiments, the provided multimedia content may be presented as a shared experience to multiple clients within client side 101. Clients that are participants in a collaboration group may provide user input that is added to the shared multimedia experience. The multimedia content provided as part of the shared multimedia experience may be associated with metadata that includes, for example, an address, title, rating, description, or portion of the underlying contents. In addition, the metadata may include answers provided by collaboration group members, statistics regarding answers provided by all collaboration group members, and other such information provided as part of an interactive, shared, multimedia experience.

As shown, client side 101 and server side 102 are linked by access network 130. In embodiments of MCDN 100 that leverage telephony hardware and infrastructure, access network 130 may include the "local loop" or "last mile," which refers to the physical cables that connect a subscriber's home or business to a local exchange. In these embodiments, the physical layer of access network 130 may include both twisted pair copper cables and fiber optics cables. In a fiber to the curb (FTTC) access network, the "last mile" portion that employs copper is generally less than approximately 300 miles in length. In fiber to the home (FTTH) access networks, fiber optic cables extend all the way to the premises of the subscriber.

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

Access network 130 may transmit radio frequency (RF) signals over coaxial cables. In these embodiments, access network 130 may utilize quadrature amplitude modulation (QAM) equipment for downstream traffic. Also in these embodiments, access network 130 may receive upstream traffic from a consumer's location using quadrature phase shift keying (QPSK) modulated RF signals. In such embodiments, a cable modem termination system (CMTS) may mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements (e.g., emergency alert system messages) from local entities. The regional VHOs may then deliver the local and national content to users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 may communicate over a public network 112, including, for example, an Internet or other type of Web network which is signified in FIG. 1 by the World Wide Web icon 111.

As shown in FIG. 1, client side 101 of MCDN 100 depicts two of a potentially large number of client side resources referred to herein simply as clients 120. Each client 120, as shown, includes an MPR 121, a residential gateway (RG) 122, a program presentation device 124, and a remote control device 126. In the depicted embodiment, MPR 121 communicates with server side devices through access network 130 via RG 122. As shown, client 120-2 is located within the geographic area 105 and client 120-1 is located within geographic area 103. In accordance with disclosed embodiments, client 120-1 and client 120-2 may serve collaboration group members that participate in a collaboration group while receiving a shared multimedia experience provided through access network 130.

As shown in FIG. 1, RG 122 may include elements of a broadband modem such as a DSL or cable modem, as well as elements of a firewall, router, and/or access point for an Ethernet or other suitable local area network. In some embodiments, MPR 121 is a uniquely addressable Ethernet compliant device. Program presentation device 124 may be, for example, any National Television System Committee (NTSC) and/or Phase Alternating Line (PAL) compliant display device. Both MPR 121 and program presentation device 124 may include any form of conventional frequency tuner. As shown, remote control device 126 communicates wirelessly with MPR 121 using infrared (IR) or RF signaling. Remote control devices 126 may be used to provide user input that is contributed to the shared multimedia experience. Remote control device 126 may be used to navigate graphical user interfaces presented on program presentation devices 124.

In IPTV compliant implementations of MCDN 100, clients 120 are configured to receive packet-based multimedia streams from access network 130 and process the streams for presentation on displays 124. In addition, clients 120 are network-aware resources that may facilitate bidirectional-networked communications with server side 102 resources to support network hosted services and features. Because clients 120 are configured to process multimedia content streams while simultaneously supporting more traditional Web like communications, clients 120 may support or comply with a variety of different types of network protocols including streaming protocols such as real-time transport protocol (RTP) over user datagram protocol/Internet protocol (UDP/IP), as well as web protocols such as hypertext transport protocol (HTTP) over transport control protocol (TCP/IP).

The server side 102 of MCDN 100, as depicted in FIG. 1, emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down linked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. Live acquisition server 140 is communicatively coupled to an encoder which, prior to transmission, encodes acquired content using any suitable video codec including for example without limitation MPEG-2, MPEG-4, and Windows Media Video (WMV).

Content delivery resources 107, as shown in FIG. 1, communicate with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content according to the network communication protocol stack in use. These data packets are then transmitted across a network to a receiver (e.g., MPR 121 of client 120), where the content is processed for consumption by users.

User requests received by content delivery server 155 may include an indication of the content that is being requested. In some embodiments, this indication includes a network endpoint associated with the desired content. The network endpoint may include an IP address and a transport layer port number. For example, a particular local broadcast television station may be associated with a particular channel and the feed for that channel may be associated with a particular IP address and transport layer port number. When a user wishes to view the station, the user may interact with remote control device 126 to send a signal to MPR 121 indicating a request for the particular channel. When MPR 121 responds to the remote control signal, the MPR 121 changes to the requested channel by transmitting a request that includes an indication of the network endpoint associated with the desired channel to content delivery server 155.

Content delivery server 155 may respond to such requests by making a streaming video or audio signal accessible to the user. Content delivery server 155 may employ a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including RTP, real-time control protocol (RTCP), file transfer protocol (FTP), and real-time streaming protocol (RTSP).

In some embodiments, client-facing switch 113 routes multimedia content encapsulated into IP packets over access network 130. For example, an MPEG-2 transport stream may be sent in which the transport stream consists of a series of 188-byte transport packets. The MPEG-2 transport stream may include video and audio portions of a multimedia program included for a presentation on a user's program presentation device (e.g., display), which may receive one or more signals from a digital television STB, in accordance with disclosed embodiments. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, MPR 121 may access MCDN 100 using information received from client gateway 153. Subscriber devices may access client gateway 153, and client gateway 153 may then allow such devices to access private network 110 once the devices are authenticated or verified. Similarly, client gateway 153 may prevent unauthorized devices, such as hacker computers or stolen STBs, from accessing the private network 110. Accordingly, in some embodiments, when an MPR 121 accesses MCDN 100, client gateway 153 verifies subscriber information by communicating with user store 172 via the private network 110. Client gateway 153 may verify billing information and subscriber status by communicating with an OSS/BSS gateway 167, which may translate a query to OSS/BSS server 181. Upon client gateway 153 confirming subscriber and/or billing information, client gateway 153 may allow MPR 121 access to IPTV content, VOD content, and other services. If client gateway 153 cannot verify subscriber information (i.e., user information) for MPR 121, for example, because it is connected to an unauthorized local loop or RG, client gateway 153 may block transmissions to and from MPR 121 beyond the access network 130.

MCDN 100, as depicted, includes application resources 105, which communicate with private network 110 via application switch 117. Application resources 105, as shown, include application server 160 which is operable to host or otherwise facilitate one or more subscriber applications 165 that are made available to system subscribers. For example, subscriber applications 165, as shown, include EPG application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a user, who may be a subscriber to a service provided by MCDN 100. For example, in accordance with disclosed embodiments, user application 164 may support collaboration group members participating in a collaboration group while receiving a shared multimedia experience. User application 164 may also enable users to provide user input during a collaboration session and may process the input to characterize the users. In some cases, user application 164 characterizes the multimedia programs. User application 164, as illustrated in FIG. 1, emphasizes the ability to extend the network's capabilities by implementing a network-hosted application. Because application 164 may reside on the network, it generally does not impose any significant requirements or imply any substantial modifications to client 120 including MPR 121. In some instances, an MPR 121 may require knowledge of a network address associated with user application 164.

As shown in FIG. 1, a database switch 116, as connected to applications switch 117, provides access to database resources 109. Database resources 109 include database server 170 that manages a system storage resource 172, also referred to herein as user store 172. User store 172, as shown, includes one or more user profiles 174 where each user profile includes collaboration group information, account information, and may include preferences information that may be retrieved by applications executing on application server 160 including subscriber applications 165.

As shown in FIG. 1, member collaboration system 189 (MCS) is enabled for providing a collaborative multimedia interaction service to users of clients 120. Accordingly, MCS 189 enables a first member of client 120-1 and a second member of client 120-2 to participate in a collaboration group that receives a shared multimedia experience. The first member of client 120-1 receives a multimedia object in location 103 (i.e., a first location) and a second member (i.e., the user of client 120-2) simultaneously receives the multimedia object in location 105 (i.e., a second location). Illustrative nonlimiting examples of multimedia objects include movies, television programs, pay-per-view events, VOD events, or puzzles.

In operation, MCS 189 prompts members of the collaboration group to provide input related to the multimedia object. Prompting the members of the collaboration group may include displaying a question about the multimedia object and suggesting answers to displayed questions. The questions and suggested answers may be provided through client side 102 and processed by MPR 121 and included within a graphical user interface for presentation on program presentation device 124. In addition to answering questions such as trivia questions, MCS 189 may request that collaboration group members predict a future portion of the multimedia object. For example, if a football game is broadcast live to users of clients 120, the users may be asked to predict the outcome of portions (e.g., whether a team will win) of the football game.

Input provided by collaboration group members is processed and may be used to determine characteristics of the collaboration group members and multimedia object provided as a shared experience. For example, if trivia questions are presented to collaboration group members and one particular collaboration group member correctly answers the trivia questions every time, MCS 189 may determine that the user is interested in the subject of the trivia questions. In some cases, demographic information related to users may be predicted by comparing received user input to responses expected from certain demographic members. If participation in a question session is low, it may be determined that the multimedia object is relatively unpopular.

In some cases, the collaboration group members may compete to correctly answer questions related to multimedia objects received as a shared experience. Accordingly, MCS 189 may be enabled to evaluate user responses and provide the results of the evaluations to clients 120 for display. A winning member of the collaboration group may be determined by MCS 189. Assessing the input received from collaboration group members may include timing the responses of the collaboration group members. A timestamp may be associated with when a question is presented to a collaboration group member and a timestamp may be associated with when a correct answer is received from the collaboration group member. In some cases, latencies may be involved with presenting questions to collaboration group members in different geographic areas. MCS 189 may use timestamps to account for the latencies.

Accordingly, MCS 189 as shown may include a data processing system for use with an MCDN 100 for collecting and distributing collaborative user input related to a shared multimedia program. MCS 189, like other data processing systems and servers, may include or have access to tangible, computer readable storage with embedded executable instructions. The instructions may enable MCS 189 and associated components to recognize members of a collaboration group. In some cases, a collaboration group administrator may permit or control access to the collaboration group. When a user logs into a session to view multimedia content, the user may choose to participate in a collaboration group by navigating a graphical user interface presented on program presentation device 124.

After verifying during login that a user is a collaboration group member and after receiving a user request to participate in the collaboration group, MCS 189 may execute instructions for requesting that MCDN 100 provide portions of a multimedia program to members of the collaboration group. Often, the requests for user response relate to portions of the multimedia program provided as a shared experience. Each member receives a request for user response and provides appropriate input. In some cases, collaboration group members may not provide any input, and in such cases timeout instructions may signal to MCS 189 that no timely user input for a particular member has been provided.

Storage instructions enable MCS 189 to store data indicative of collaboration group member responses. Collaboration group members may receive indications from other collaboration group members. On a display, group members may compare their responses to the responses provided by others. In this way, collaboration members may compete or gauge their responses against the responses of others.

In some embodiments, MCS 189 and clients 120 may support the establishment of peer-to-peer connections between clients. Peer-to-peer connections may be used to communicate between clients and provide received user input as part of a shared multimedia experience. In such cases, received user input may be provided as part of a peer-to-peer connection while the multimedia program that is subject to the user input is broadcast, simulcast, or otherwise distributed by MCDN 100.

MCS 189 may include instructions for detecting events that are used as the basis of questions asked to collaboration group members. Accordingly, subtitle data, audio data, metadata, and video data may be analyzed to detect possible questions that are posed to the collaboration group members. For example, if a football game is presented as a shared multimedia experience, MCS 189 may be enabled to detect when a field goal is about to be attempted. Speech recognition applications may detect this, for example, by analyzing what an announcer says. In such a situation, all collaboration group members may be presented with a question regarding whether the field goal attempt will be successful. If the football game is broadcast to members of the collaboration group simultaneously and at least substantially in real time, the outcome of the field-goal attempt will be undetermined at the time that the request is made to the collaboration group members. The question may be presented to collaboration group members as text overlaid upon a display of the multimedia object or within a picture in picture display, as examples.

In another exemplary embodiment, MCS 189 and related components of MCDN 100 perform a disclosed method for providing shared multimedia content to a plurality of members of a collaboration group. The shared multimedia content, in some embodiments, includes at least one of a television program, a movie, or a real-time event. The disclosed method includes requesting input related to the multimedia content from a portion of the plurality of members. The requested input may include an indication of a prediction or a trivia answer. The disclosed method may further include modifying the shared multimedia content to include an indication of a portion of the member input. The modified, shared multimedia content is provided to the plurality of members.

Figure 2:
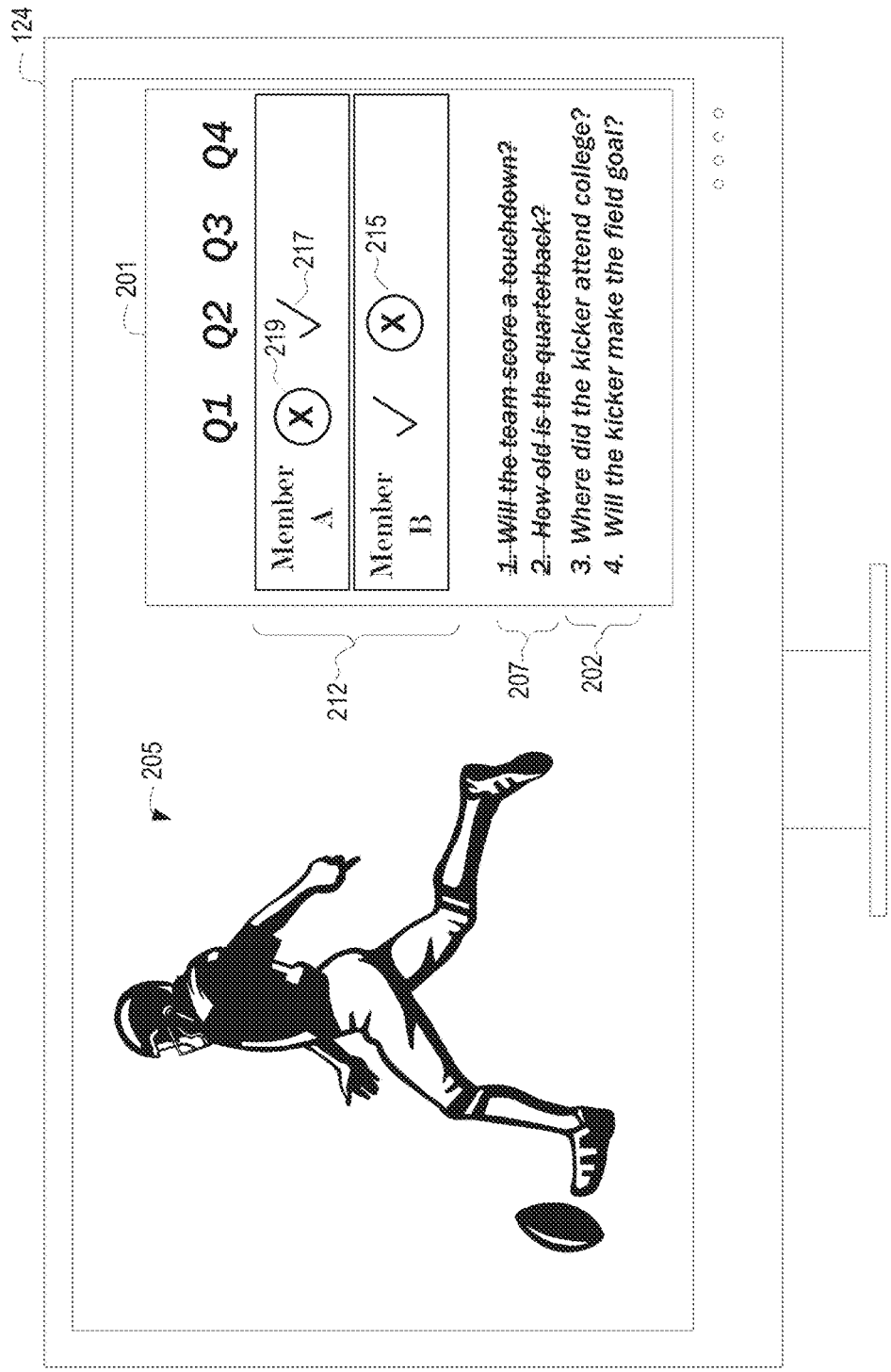
FIG. 2 depicts a display device for receiving a multimedia program and providing user input related to the multimedia program.

Referring now to FIG. 2, program presentation device 124 includes multimedia content 205 and collaborative content window 201. As shown, multimedia content 205 includes a football player that is about to attempt a field goal. Multimedia content 205 may be part of a live broadcast of a football game, and at the time of viewing, whether the football player makes the field goal attempt is undetermined. As shown, collaborative content window 201 includes windows 212 that include data for two collaboration group members. The collaboration group members have previously been asked two questions, shown as questions 207. Specifically, the two collaboration group members were previously asked whether the team would score a touchdown, and the age of the quarterback.

The question regarding whether the team would score a touchdown was previously asked and the question included, at the time it was asked, a request for a prediction regarding an undetermined event. As shown by indication 219, one collaboration group member answered the question incorrectly. Regarding a second question, which was a question regarding the age of the quarterback, indication 217 illustrates that one collaboration group member successfully answered the question while another collaboration group member, according to indication 215, incorrectly answered the question. The question regarding the age of the quarterback was a trivia question.

In some embodiments, disclosed systems may analyze subtitle data, metadata, audio data, and video data, to determine when to ask particular questions. If video data and audio data is analyzed and it is determined that a field goal is about to be attempted, this may prompt a request for a prediction as to whether the field goal will be successfully made. Speech recognition technology may be used to analyze audio data to pick up phrases such as "attempt a field goal." Similarly, detecting that a field goal is about to be attempted may prompt asking a trivia question regarding where the kicker attended college. As shown, questions 202 are provided in this way to one or more users of program presentation device 124.

Collaborative content window 201 may appear on program presentation device 124 at the request of or in response to permission by an administrator of a collaboration group. Group members may configure whether collaborative content window 201 appears as a picture in picture, as an overlay image, as an audio presentation, or on a device other than program presentation device 124. For example, collaborative content window 201 may be sent through a public or private network to a mobile telephony device or data processing system (e.g., laptop computer).

Figure 3:
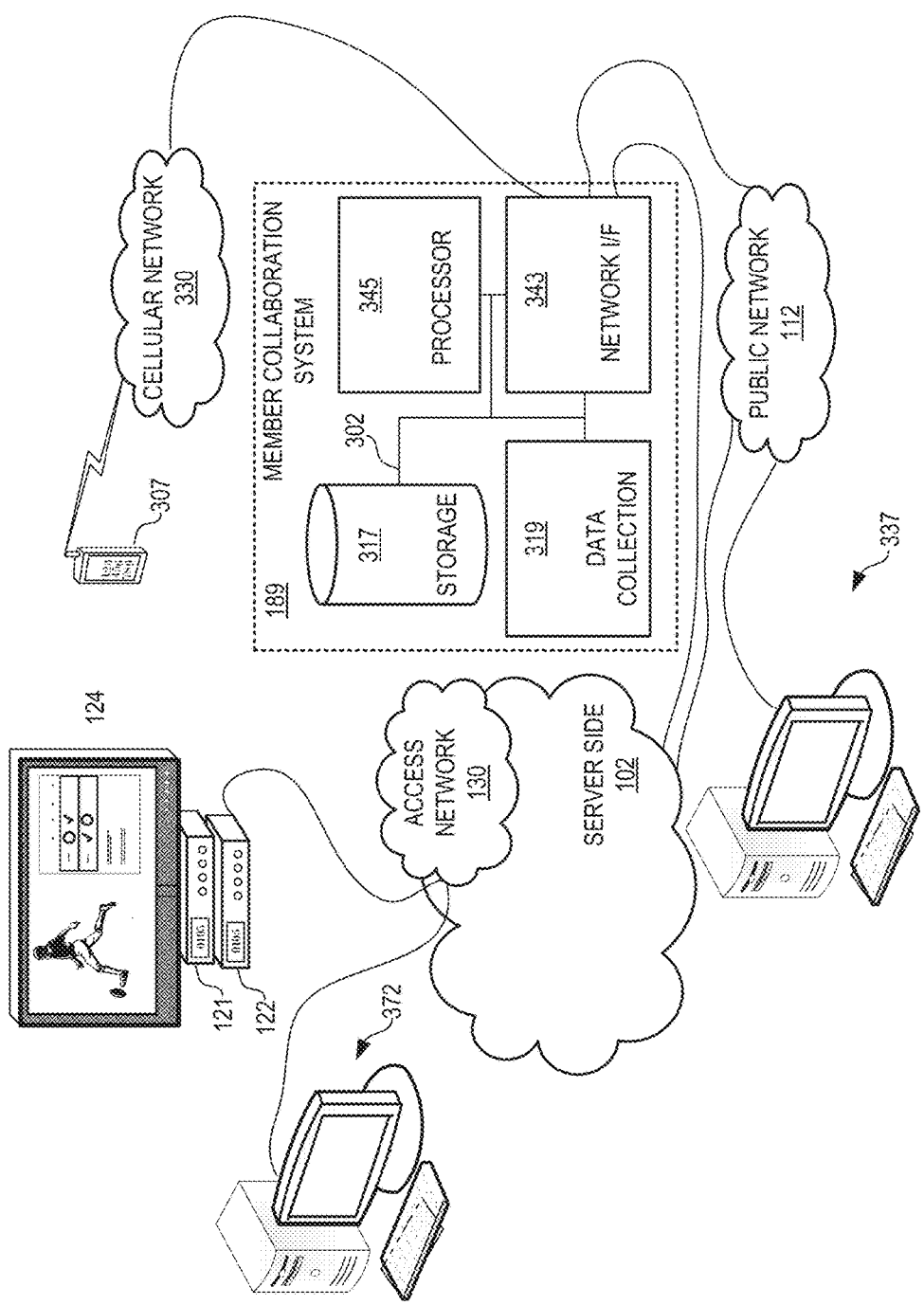
FIG. 3 represents a member collaboration system and related components for providing a shared multimedia experience with user input.

Referring now to FIG. 3, further details from FIG. 1 regarding MCS 189 are depicted. MCS 189 supports collaboration group members receiving a shared multimedia program while updating the shared multimedia program with user input from multiple collaboration group members. As shown, data processing system 372, in response to user input, requests content from server side 102. Requested content may include, without limitation, live television, VOD movies, pay-per-view events, puzzles, Web pages, and photographic files. As shown, MCS 189 is communicatively coupled to server side 102, which allows MCS 189 to receive user input, process it, and provide it for updating within a shared multimedia experience.

User input from collaboration group members may be provided using data processing system 337, data processing system 372, or mobile telephony device 307. Data processing system 372, data processing system 337, mobile telephony device 307, and program presentation device 124 may each be located in separate geographic locations. Alternatively, one or more of the devices may be in the same residence, for example, but each may be in a different room. Therefore, the devices may be within the same general geographic location but may not be within a line of sight from one another.

In the depicted embodiment in FIG. 3, MCS 189 includes at least one processor 345 that is operable to access storage 317. A network interface card (NIC) 343 connects to the shared bus 302 and supports communication between processor 345 and network connected resources.

As shown, processor 345 is communicatively coupled to data collection module 319 for collecting and storing data related to shared multimedia experiences. Data collection module 319 includes instructions for processing user input to characterize users or to characterize multimedia programs. A user may be assigned to a particular demographic group. For example, data collection module 319 may determine that user input received from a user is similar to input received from others known to be within the demographic group.

To classify a multimedia program based on user input, data collection module 319 may analyze user input regarding quality and quantity to determine an interest level in a multimedia program. Viewership of the multimedia program may also be determined. For example, if data collection module 319 determines that collaboration group members are providing user input related to a multimedia program, MCS 189 may determine that the collaboration group members are watching the multimedia program. If the multimedia program includes an advertisement or a commercial, such data regarding viewership may be useful for determining exposure to the advertisement or commercial. It may also be used to influence content of future multimedia programs, by determining what within certain multimedia programs is interesting. Data regarding multimedia programs and collaboration group members can be stored within storage 317.

In some embodiments, an administrator may determine what multimedia content and what questions are presented to collaboration group members during a collaborative session. Data collection module 319 receives input from an administrator over NIC 343 from data processing system 337 over public network 112 (e.g., an Internet). Similarly, data collection module 319 may receive administrator input from wireless telephony device 307 over cellular network 330.

In some embodiments, data collection module 319 determines when to request input from the collaboration group members. Metadata, audio data, and video data for multimedia programs presented as a shared multimedia experience may be stored in data storage 317 for analyzing. Data collected by data collection module 319 may be reported over NIC 343 to an administrator device (e.g., over cellular network 330 to wireless telephony device 307). In some embodiments, streaming video that is a portion of a shared multimedia experience may be provided to wireless telephony device 307 or data processing system 337, which may both be administrator communication devices.

As shown in FIG. 3, MCS 189 may be configured with computer readable instructions to perform a disclosed method of recognizing a first member and a second member of a collaboration group, providing a portion of a multimedia program to the first member and to the second member, providing a request for user response to at least one of the first member and second member, and receiving a first member user response. In disclosed embodiments, the first member user response is responsive to the request and related to the multimedia program. Further instructions enable MCS 189 to store data indicative of the first member user response and provide an indication of the first member user response to the second member.

The disclosed method may include receiving a user request to participate in a collaboration group. The user request may be received through remote control device commands processed by MPR 121 and relayed by RG 122 to server side 102 through access network 130. As shown, MCS 189 is communicatively coupled to server side 102 and, in response to the user request, is configured to process login credentials and determine permissions for participation within a collaboration group.

MCS 189 may analyze metadata for multimedia programs to determine when to request user input from collaboration group members. MCS 189 may access metadata associated with multimedia programs from server side 102 or may access and receive the metadata or content contained in the metadata from third party sources (e.g., third party networks, servers, or Web pages). Example metadata includes but is not limited to: an audio portion of the shared content, a video portion of the shared content, a classification of the shared content, an address of the shared content, transcripts related to the shared content, and the like. As shown, the metadata and user input may be stored to data storage 317 and accessed by data collection module 319. The shared multimedia content may be updated with indications and classifications of user input and this information may be distributed to collaboration group members.

The communication link between NIC 343 and cellular network 330 may be wire based, wireless, IP based, or use other technologies and protocols. A user (i.e., an administrator) of wireless telephony device 307 or data processing system 337 may provide input that is presented in the form of administrative messages to the user of program presentation device 124 or the user of data processing system 372.

In some embodiments, MCS 189 is enabled for providing a plurality of selectable answers to members of a collaboration group, receiving responses from the members of the collaboration group, and determining response evaluations based on the member responses. An indication of the member response evaluations may be provided to one or more members of the collaboration group. The member response evaluations may be aggregated, summarized, and rated for presentation to selected collaboration group members.

Figure 4:
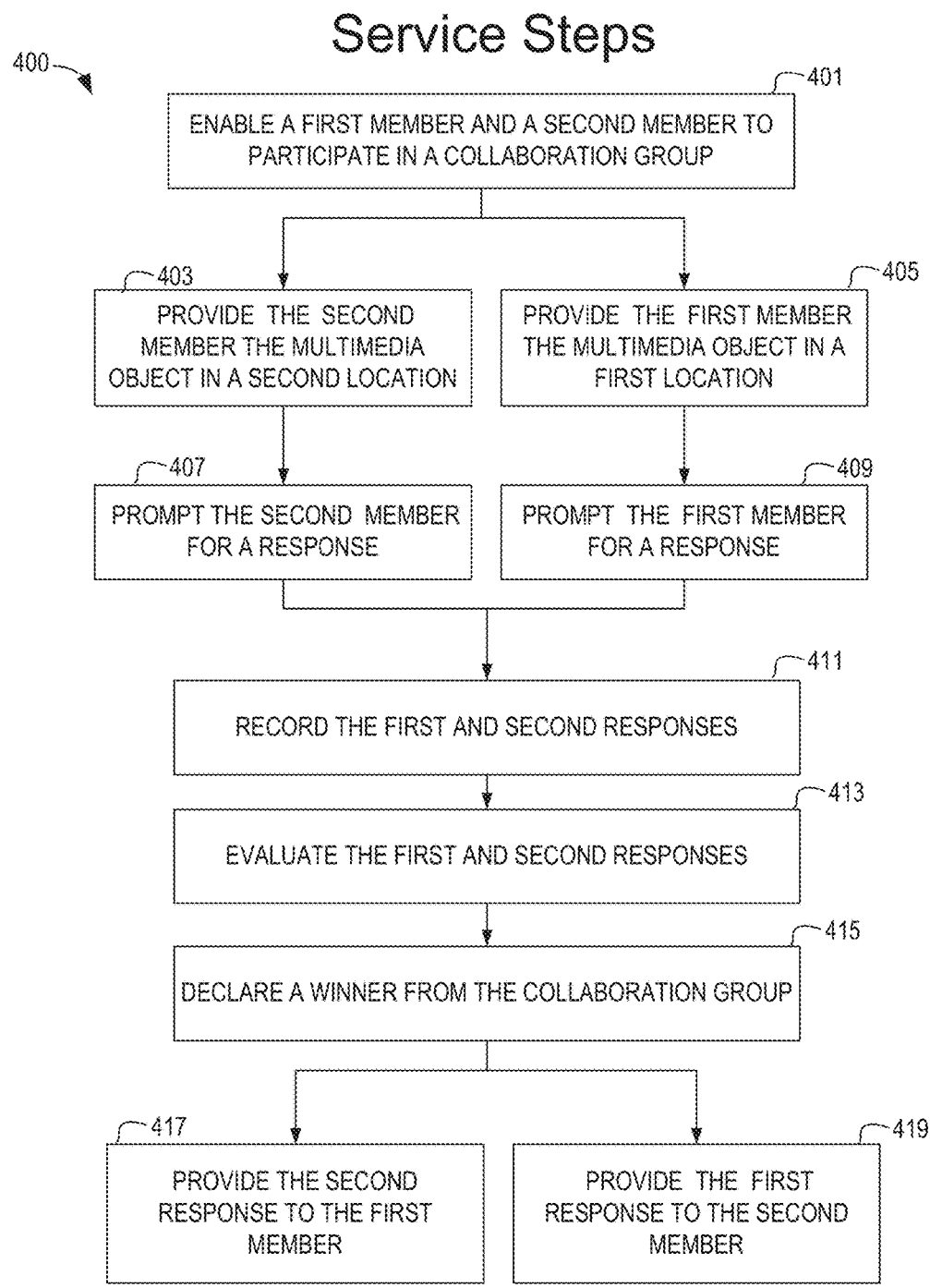
FIG. 4 is a flow diagram of selected elements of a service that enables members of a collaboration group to receive a shared multimedia experience and contribute user input.

FIG. 4 illustrates selected aspects of service 400 for supporting collaboration between group members regarding shared multimedia experiences. As shown, service 400 includes enabling (block 401) a first member and a second member to participate in a collaboration group. The collaboration group may be organized by one or more members that are users or subscribers of an Internet service provider such as MCDN 100 (FIG. 1). The first member is provided (block 405) a multimedia object in a first location, and a second member is provided (block 403) a multimedia object in a second location. The first and second locations may be in different geographic areas, or may be within, for example, rooms within a residence that do not permit certain line of sight communication. Service 400, as shown, includes prompting (block 409) the first member for a response and prompting (block 407) the second member for a response. Prompting the first and second members for response may include for example, without limitation, asking the members to answer a trivia question, asking the members to predict the outcome of an event, or asking the members for input to a puzzle. In some embodiments, group members may also be prompted to guess what answers other group members provided.

Service 400 further includes recording (block 411) the first and second responses. Such recording or storing may occur locally on a CPE device or remotely on a network device (e.g., MCS 189 in FIG. 3). In some embodiments, the first and second responses are evaluated (block 413) to determine correctness. Disclosed embodiments may associate timestamps with member responses and use the timestamps to determine the speed of responses. If the first member and second member are prompted for responses at different times, timestamps may also be associated with prompts provided to the members, and evaluating the member responses may include subtracting the timestamp for the response from timestamps associated with prompting the members for the responses. If collaboration group members are competing, service 400 may include declaring (block 415) a winner from the collaboration group. A winner may be chosen based on responses accumulated during the broadcast of a multimedia object. In some embodiments, members are provided with an indication of responses of other members. Accordingly, the response from the first member (i.e., the first response) is provided (block 419) to the second member and the response from the second member (i.e., the second response) is provided (block 417) to the first member. In some embodiments, the service may include providing members with the cumulative statistics for several users that may or may not be part of the members' collaboration group.

Figure 5:
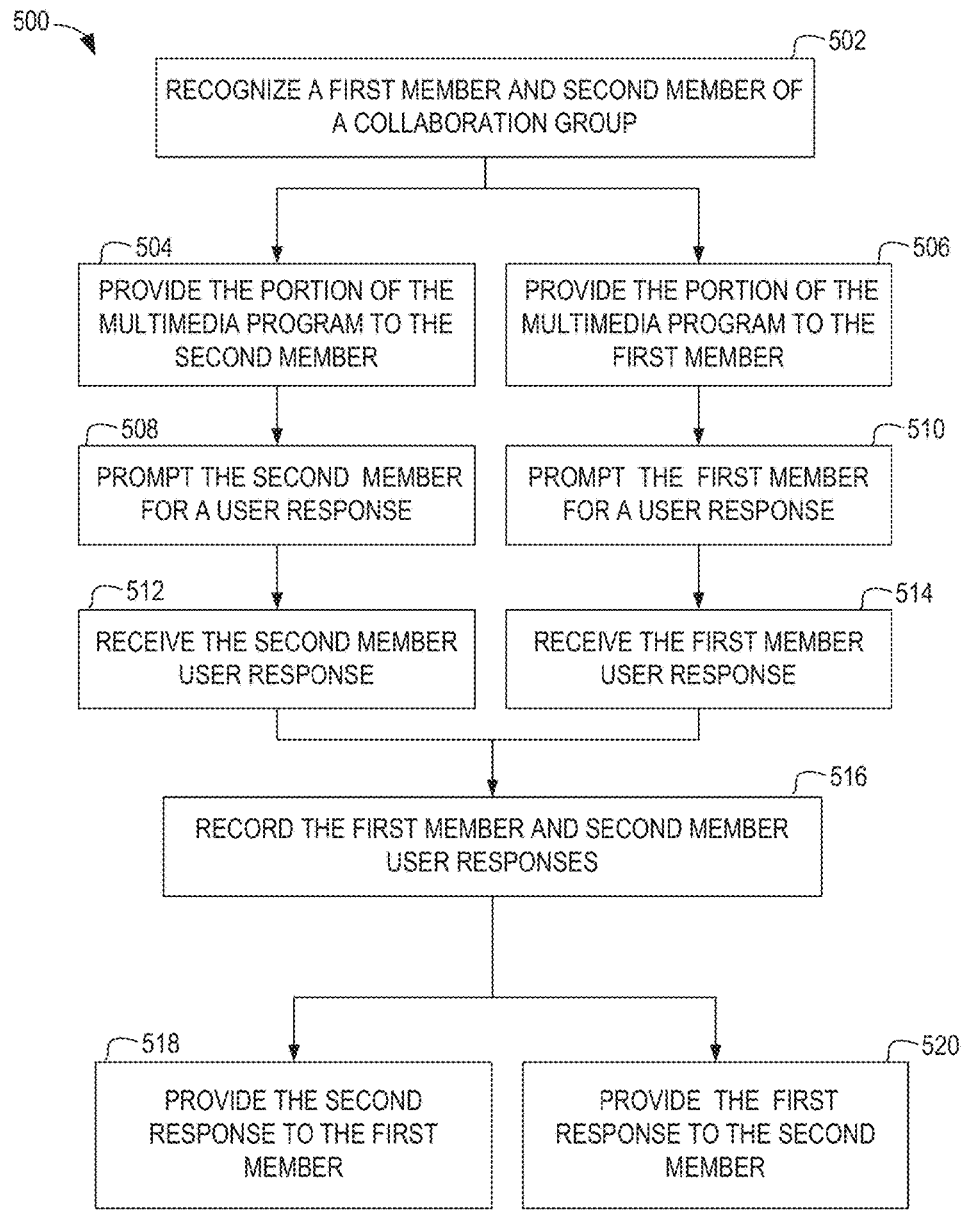
FIG. 5 is a flow diagram of selected elements of a method that enables members of a collaboration group to receive a shared multimedia experience and contribute user input.

FIG. 5 illustrates selected aspects of method 500 for supporting collaboration between group members regarding shared multimedia experiences. A first member and a second member are recognized (block 502) as members of a collaboration group. Recognition of members of a collaboration group may occur when the members log in to an account for receiving multimedia content. For example, a user may provide login credentials through remote control device input that is processed by an MPR to allow the member access to television content. In some embodiments, multiple members in disparate geographic areas may plan for a shared experience and log in to their respective accounts at or near the same time. In some cases, one member may act as an administrator, and select multimedia objects for consumption by the collaboration group members. In accordance with disclosed embodiments, collaboration group members may also provide input using disclosed systems as a way to vote for or request which multimedia program is received by collaboration group members.

As shown in FIG. 5, method 500 further includes providing (block 506) a portion of the requested multimedia program to a first member and providing (block 504) the same portion of the multimedia program to the second member. Portions of the multimedia program are, in many cases, provided in order from start to finish as originally produced. In some cases, an administrator or other group member may fast-forward or reverse to various portions of the provided multimedia content.

Method 500 further includes prompting (block 510) the first member for a user response and prompting (block 508) the second member for a user response. Prompting the members for responses may include asking the members a trivia question, asking the members to predict possible outcomes of the multimedia program, or enabling the members to provide input to a puzzle. In some cases, prompting the members includes providing predetermined answers or suggestions to assist the members with providing responses.

A first member user response is received (block 514) and a second member user response is received (block 512). Member user responses may be provided when the members navigate a graphical user interface, for example using remote control device inputs. In some embodiments, members may provide input to devices that do not communicate directly or locally with an IPTV access network. For example, a cellular telephone network may be used to receive member user responses. Accordingly, a member user may provide response data using a mobile telephony device to send a short messaging service (SMS) text message or a computer to send an e-mail.

First member and second member responses are recorded (block 516) and indications of the recorded responses are provided to the members. In some embodiments, a first response provided by a first group member is provided (block 520) to the second group member and the second response provided by the second group member is provided (block 518) to the first group member.

Figure 6:
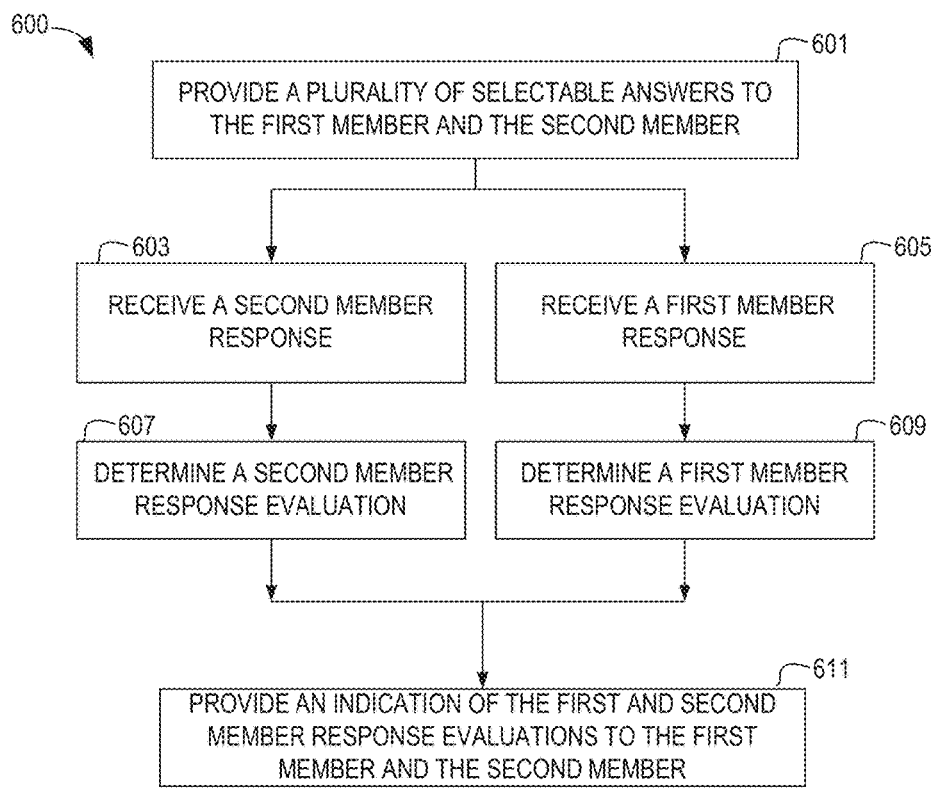
FIG. 6 is a flow diagram of further elements for enabling members of a collaboration group to receive a shared multimedia experience and contribute user input.

FIG. 6 illustrates further aspects of disclosed embodiments shown as method 600. As shown, method 600 includes providing (block 601) a plurality of selectable answers to the first member and the second member. The selectable answers may include example answers. For example, if members of a collaboration group are asked a trivia question regarding the date of birth of an actor, selectable answers may include 1950, 1945, 1957, and 1952. A first member response is received (block 605) and a second member response is received (block 603). In some embodiments, one or more of the member responses includes an indication that a member has not responded. For example, a CPE device such as an MPR may signal a network based collaboration system, after a timeout or the expiration of a predetermined time, that no response has been received by an associated group member. In some embodiments, CPE devices such as MPRs may associate timestamps with requests for responses and with received responses. The difference in the timestamps indicates a reaction time for a response. The reaction time may be used in evaluating the member response. If more than one member of a collaboration group provides a correct answer, the reaction time may be used to determine a winner. Accordingly, an evaluation is determined (block 609) for the first member response and an evaluation is determined (block 607) for the second member response. An indication of the first and second member response evaluations is provided (block 611) to the first member and the second member.

Figure 7:
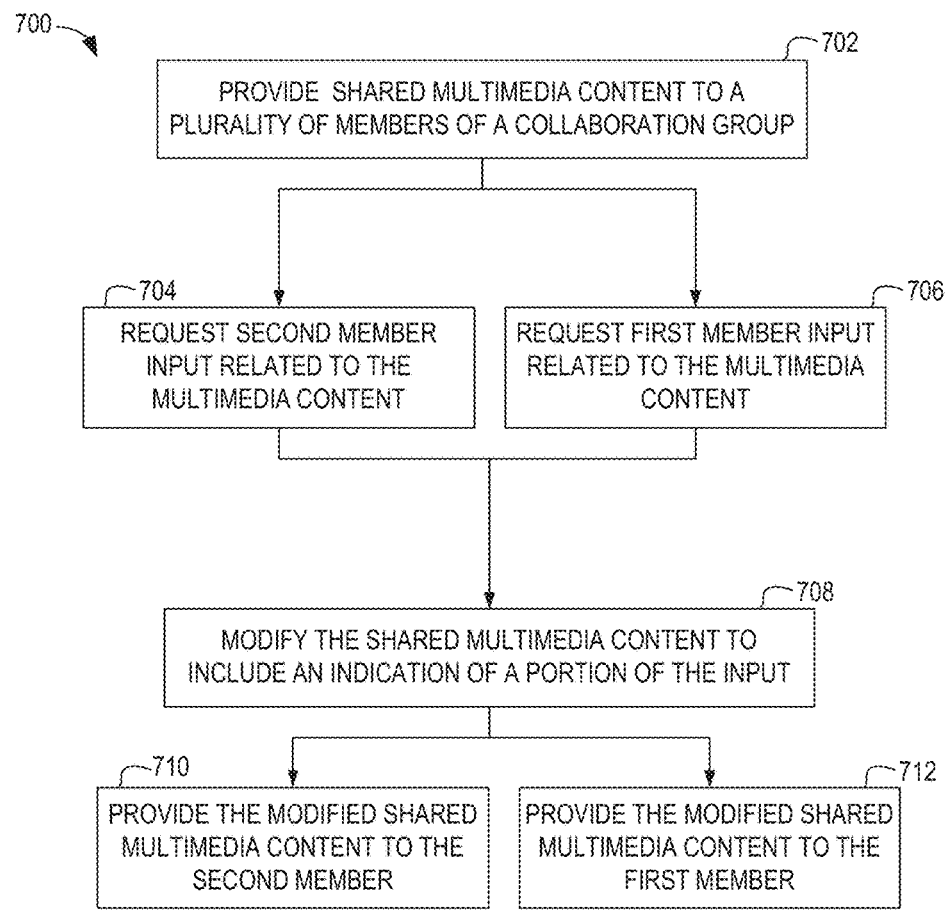
FIG. 7 is a flow diagram of further elements for enabling members of a collaboration group to receive a shared multimedia experience and contribute user input.

FIG. 7 illustrates selected elements of method 700 for supporting collaboration related to a shared multimedia experience between group members. As shown, method 700 includes providing (block 702) shared multimedia content to a plurality of members of a collaboration group. A request is provided (block 706) to a first member to provide input related to the multimedia content. Similarly, a request is provided (block 704) to a second member to provide input related to the multimedia content. The shared multimedia content is modified (block 708) to include an indication of a portion of the input received from the first member and the input received from the second member. The modified shared multimedia content is provided (block 712) to the first member and the modified shared multimedia content is provided (block 710) to the second member.

Figure 8:
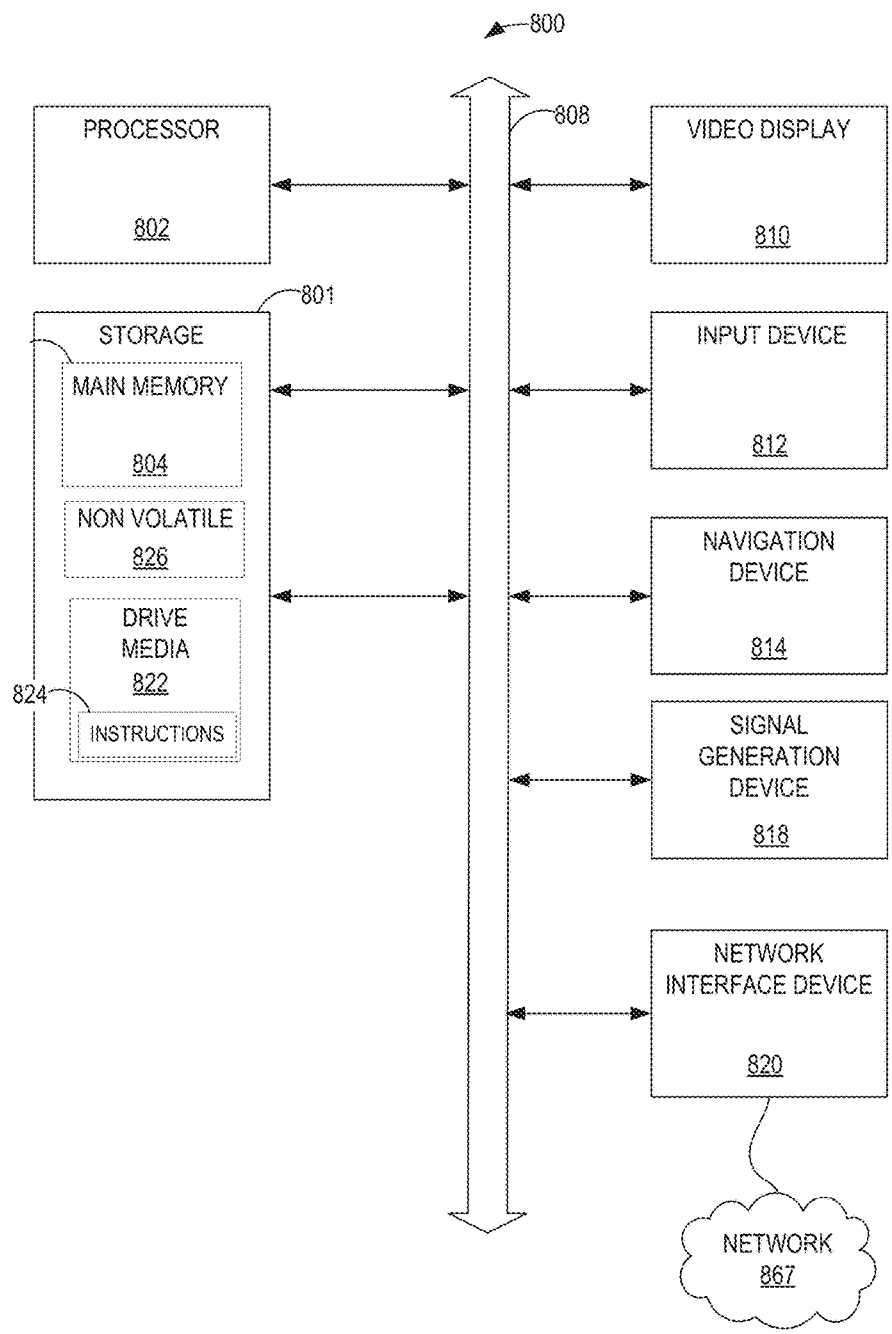
FIG. 8 is a block diagram illustrating representative elements of a data processing system that may be enabled for contributing user input to a shared multimedia experience.

FIG. 8 illustrates, in block diagram form, selected elements of an embodiment of a data processing system 800 within which a set of instructions operates to perform the methodologies discussed herein. Data processing system 800 may operate as a standalone device or may be connected (e.g., networked) to other data processing systems. In a networked deployment, data processing system 800 may operate in the capacity of a server or a client data processing system in a server-client network environment, or as a peer computer in a peer-to-peer (or distributed) network environment. Example data processing systems include, but are not limited to, an MPR, an STB, a computer, a client, a digital video recorder, a personal computer (PC), a tablet PC, a cable box, a satellite box, an EPG box, a personal digital assistant, a cellular telephone, a smart phone, a web appliance, a network router, a switch, a bridge, a server, or any machine capable of executing a set of instructions (sequential or otherwise) that specify actions to be taken by that machine. Further, while only a single data processing system is illustrated, the term "data processing system" shall also be taken to include any collection of data processing systems that individually or jointly execute a set (or multiple sets) of instructions to perform any one or more of the methodologies discussed herein.

As shown in FIG. 8, data processing system 800 includes a processor 802 (e.g., a central processing unit, a graphics processing unit, or both) and storage 801 that includes a main memory 804 and a non-volatile memory 826. Drive media 822 and other components of storage 801 communicate with processor 802 via bus 808. Drive media 822 includes a magnetic or solid state machine-readable medium that may have stored thereon one or more sets of instructions 824 and data structures (not depicted) embodying or utilized by any one or more of the methodologies or functions described herein. The instructions 824 may also reside, completely or at least partially, within the main memory 804, within non-volatile memory 826, and/or within the processor 802 during execution thereof by the data processing system 800. Data processing system 800 may further include a video display unit 810 (e.g., a television, a liquid crystal display or a cathode ray tube) on which to display Web content, multimedia content, and input provided during collaboration sessions. Data processing system 800 also includes input device 812 (e.g., a keyboard), navigation device 814 (e.g., a remote control device or a mouse), signal generation device 818 (e.g., a speaker) and network interface device 820. Input device 812 and/or navigation device 814 (e.g., a remote control device) may include processors (not shown), and further memory (not shown).

Instructions 824 may be transmitted or received over network 867 (e.g., a multimedia content provider network) via network interface device 820 using any one of a number of transfer protocols (e.g., broadcast transmissions, HTTP).

As used herein the term "machine-readable medium" should be construed as including a single medium or multiple media (e.g., a centralized or distributed database, and/or associated caches and servers) that may store all or part of instructions 824. The term "machine-readable medium" shall also be taken to include any medium that is capable of storing, encoding, or carrying a set of instructions (e.g., instructions 824) for execution by a machine (e.g., data processing system 800) and that cause the machine to perform any one or more of the methodologies or that is capable of storing, encoding, or carrying data structures utilized by or associated with such a set of instructions. The term "machine-readable medium" shall, accordingly, be taken to include but not be limited to solid-state memories, optical media, and magnetic media.

In accordance with some disclosed embodiments, data processing system 800 executes instructions 824, which may include instructions for recognizing a first member and a second member of a collaboration group, providing a portion of the multimedia program to the first member and second member, providing a request for user response to at least one of the first member and second member, receiving a first member user response, storing data indicative of the first member user response, and providing an indication of the first member user response to the second member. In some embodiments, instructions 824 include instructions for establishing a peer-to-peer connection between a first member client device and a second member client device, characterizing the first member based on the first member response, providing a plurality of selectable answers to the first member and second member, receiving first and second member responses, determining first and second member response evaluations based on the first and second member responses, and providing an indication of the first and second member response evaluations to the first and second members. Still further instructions 824 enable data processing system 800 to detect an event on which to base the requested prediction.

In accordance with other disclosed embodiments, data processing system 800 is enabled for providing shared multimedia content to a plurality of members of a collaboration group, for requesting input related to the multimedia content from a portion of a plurality of members, for modifying the shared multimedia content to include an indication of a portion of the input, and for providing the modified shared multimedia content to the plurality of members.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A multimedia distribution method comprising:
providing multimedia content to a plurality of network clients via a multimedia network;
accessing user profiles corresponding to at least some of the network clients;
identifying, from collaboration group information included in at least some of the user profiles, a plurality of collaboration groups, including a first collaboration group and a second collaboration group, and a plurality of members of each of the collaboration groups;
sending a question pertaining to the multimedia content to each of the collaboration groups;
receiving responses to the question, wherein each of the responses includes a timestamp indicative of when the response was generated and a proposed answer to the question wherein the responses include a first response from the first collaboration group and a second response from the second collaboration group wherein the first response includes a first proposed answer to the question and the second response includes a second proposed answer to the question;
modifying the multimedia content provided to the first collaboration group to include the second proposed answer and modifying the multimedia content provided to the second collaboration group to include the proposed answer;
evaluating the first proposed and the second proposed answer to the question; and
determining, based on the timestamps and the evaluating of the first proposed answer and the second proposed answer, a winning response for each of the collaboration groups.

2. The method of claim 1, wherein sending the question includes sending, in addition to the question, a set of selectable answers to the question.

3. The method of claim 1, wherein the multimedia content comprises content associated with an event and wherein the question requests a prediction regarding an outcome of the event.

4. The method of claim 1, wherein said evaluating includes evaluating a correctness of content included in a response.

5. The method of claim 4, wherein said determining of the winning response includes prioritizing responses of equal correctness in favor of a first sent response.

6. The method of claim 1, wherein receiving the first response comprises receiving the first response from a first member of the first collaboration group and wherein receiving the second response comprises receiving the second response from a second member of the second collaboration group.

7. The method of claim 6, wherein receiving the first user response includes receiving a text message indicative of the first user response and wherein receiving the second user response comprises receiving an email indicative of the second user response.

8. A data processing system, comprising:
a processor;
a non-transitory computer readable medium including processor executable instructions, wherein the instructions, when executed by the processor, cause the processor to perform operations comprising:
providing multimedia content to a plurality of network clients via a multimedia network;
accessing user profiles corresponding to at least some of the network clients;
identifying, from collaboration group information included in at least some of the user profiles, a plurality of collaboration groups including a first collaboration group and a second collaboration group, and a plurality of members of each of the collaboration groups;
sending a question pertaining to the multimedia content to each of the collaboration groups;
receiving responses to the question, wherein each of the responses includes a timestamp indicative of when the response was generated and a proposed answer to the question wherein the responses include a first response from the first collaboration group and a second response from the second collaboration group wherein the first response includes a first proposed answer to the question and the second response includes a second proposed answer to the question;
modifying the multimedia content provided to the first collaboration group to include the second proposed answer and modifying the multimedia content provided to the second collaboration group to include the proposed answer;
evaluating the first proposed and the second proposed answer to the question; and
determining, based on the timestamps and the evaluating of the first proposed answer and the second proposed answer, a winning response for each of the collaboration groups.

9. The system of claim 8, wherein sending the question includes sending, in addition to the question, a set of selectable answers to the question.

10. The system of claim 8, wherein the multimedia content comprises content associated with an event and wherein the question requests a prediction regarding an outcome of the event.

11. The system of claim 8, wherein said evaluating includes evaluating a correctness of content included in a response.

12. The system of claim 11, wherein said determining of the winning response includes prioritizing responses of equal correctness in favor of a first sent response.

13. The system of claim 8, wherein receiving the first response comprises receiving the first response from a first member of the first collaboration group and wherein receiving the second response comprises receiving the second response from a second member of the second collaboration group.

14. The system of claim 8, wherein receiving responses to the questions includes receiving a first user response from a first member of a first collaboration group and wherein the operations include:
characterizing the first member based on accuracy and frequency of a plurality of responses from the first member.

15. A non-transitory computer readable medium, including processor executable program instructions that, when executed by a processor, cause the processor to perform operations comprising:
providing multimedia content to a plurality of network clients via a multimedia network;
accessing user profiles corresponding to at least some of the network clients;
identifying, from collaboration group information included in at least some of the user profiles, a plurality of collaboration groups, including a first collaboration group and a second collaboration group, and a plurality of members of each of the collaboration groups;
sending a question pertaining to the multimedia content to each of the collaboration groups;
receiving responses to the question, wherein each of the responses includes a timestamp indicative of when the response was generated and a proposed answer to the question wherein the responses include a first response from the first collaboration group and a second response from the second collaboration group wherein the first response includes a first proposed answer to the question and the second response includes a second proposed answer to the question;
modifying the multimedia content provided to the first collaboration group to include the second proposed answer and modifying the multimedia content provided to the second collaboration group to include the proposed answer;
evaluating the first proposed and the second proposed answer to the question; and
determining, based on the timestamps and the evaluating of the first proposed answer and the second proposed answer, a winning response for each of the collaboration groups.

16. The non-transitory computer readable medium of claim 15, wherein sending the question includes sending, in addition to the question, a set of selectable answers to the question.

17. The non-transitory computer readable medium of claim 15, wherein the multimedia content comprises content associated with an event and wherein the question requests a prediction regarding an outcome of the event.

18. The non-transitory computer readable medium of claim 15, wherein said evaluating includes evaluating a correctness of content included in a response.

19. The non-transitory computer readable medium of claim 18, wherein said determining of the winning response includes prioritizing responses of equal correctness in favor of a first sent response.

* * * * *